United States Patent
Grover et al.

(10) Patent No.: US 7,686,567 B2
(45) Date of Patent: Mar. 30, 2010

(54) AIRFOIL EMBODYING MIXED LOADING CONVENTIONS

(75) Inventors: Eric A. Grover, Tolland, CT (US); Thomas J. Praisner, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 1136 days.

(21) Appl. No.: 11/303,672

(22) Filed: Dec. 16, 2005

(65) Prior Publication Data
US 2009/0317227 A1 Dec. 24, 2009

(51) Int. Cl.
F04D 27/02 (2006.01)
(52) U.S. Cl. .............. 415/1; 415/191; 416/223 R; 416/243; 416/DIG. 2
(58) Field of Classification Search .......... 416/243, 416/223 R, DIG. 5; 415/189, 191, 192, 208.1, 415/208.2, 211.2
See application file for complete search history.

(56) References Cited

U.S. PATENT DOCUMENTS

| | | | |
|---|---|---|---|
| 6,312,219 B1 * | 11/2001 | Wood et al. | 415/191 |
| 6,431,829 B1 * | 8/2002 | Watanabe et al. | 415/189 |
| 6,776,582 B2 * | 8/2004 | Segawa et al. | 416/223 R |
| 7,052,237 B2 * | 5/2006 | Segawa et al. | 415/192 |
| 2002/0172594 A1 * | 11/2002 | Segawa et al. | 415/191 |
| 2004/0200205 A1 * | 10/2004 | Frutschi et al. | 60/39.52 |
| 2005/0129524 A1 * | 6/2005 | Segawa et al. | 416/243 |

FOREIGN PATENT DOCUMENTS

WO    WO 2007042522 A1 *  4/2007

\* cited by examiner

*Primary Examiner*—Edward Look
*Assistant Examiner*—Aaron R Eastman
(74) *Attorney, Agent, or Firm*—Bachman & LaPointe, P.C.

(57) ABSTRACT

A high-lift airfoil embodying a combination of loading conventions in a single design specifically to reduce and control total pressure losses that occur in the flow channels between airfoils employed in turbomachinery applications is disclosed herein. The mixed-loading high-lift airfoil designs embody and exhibit the best total profile and secondary loss characteristics possessed by both aft-loaded airfoil and front-loaded airfoil conventions through controlling the development and interaction of boundary layers forming along the surfaces of the airfoils and the endwalls in such applications. The mixed-loading high-lift airfoil may be utilized in both rotating and non-rotating turbomachinery applications.

27 Claims, 5 Drawing Sheets

AIRFOIL EMBODYING MIXED LOADING CONVENTIONS

FIELD OF USE

The present invention relates generally to airfoils and, more specifically, to a high-lift airfoil design embodying mixed loading conventions.

BACKGROUND OF THE INVENTION

Turbomachinery applications generally employ one or more components containing rotating and/or non-rotating airfoils, for example, a compressor or a turbine. When testing the airfoils of such turbomachinery, engineers typically measure a loss of total pressure to gauge the airfoil's performance. Three well-known factors that engender total pressure loss in rows of turbomachinery airfoils are the behavior of the boundary layer along the airfoil surface, the behavior of the boundary layers along the inner and outer diameter end walls to which the airfoil is attached, and the interaction of the airfoil and endwall boundary layers with each other. Current industry practice recognizes the significance and impact of loss control but does not yet fully understand the underlying physics governing the generation of these losses.

A fundamental mechanism of the airfoil is to turn the fluid medium in which it is present. By doing so, the airfoil will develop a distribution of fluid pressure, or a pressure loading, over its surfaces. This distribution is highly dependent on the motion of the fluid near the airfoil surface as determined by the local airfoil geometry. Thus, it is possible to influence the pressure loading of the airfoil by means of airfoil design. Designs that favor placing the bulk of the pressure loading closer to the leading edge of the airfoil are commonly referred to as front-loaded airfoils. Similarly, designs that favor placing the bulk of the pressure loading closer to the trailing edge of the airfoil are commonly referred to as aft-loaded airfoils. The distribution of loading on an airfoil surface is commonly referred to as the loading convention of the airfoil, and members of the turbomachinery industry tend to favor one loading convention over another based on their own experiences and design philosophy.

For instance, most turbomachinery applications employ turbines and/or compressors equipped with airfoils possessing a loading convention distributed uniformly across the span of the airfoil, from root to tip, a practice which is standard within the industry. The airfoils may be positioned relative to one another in order to meet design requirements by varying the working medium fluid area of the passageway, that is, the minimum (or throat) area between two airfoils as measured by the integration along the airfoil span of a minimum distance line from the suction-side of one airfoil to the pressure side of an adjacent airfoil. However, repositioning the airfoils alone will ultimately not improve performance and reduce pressure losses due to the continued use of airfoils embodying standard loading conventions, that is, aft-loaded or front-loaded.

The spanwise distribution of the total pressure loss can be categorized into two distinct regions, each controlled by a separate mechanism. First, the total pressure loss near the middle portion of the airfoil away from the end walls, referred to as the airfoil profile loss, is highly dependent on the behavior of the airfoil surface boundary layer. It has been shown that front-loaded airfoils tend to generate less profile loss than does an aft-loaded airfoil. Likewise, the total pressure loss near the root and tip section of the airfoil close to the end walls, referred to as the secondary loss, is highly dependent on both the end wall boundary layer as well as the interaction of the end wall boundary layer with the airfoil surface boundary layer. It has been shown that aft-loaded airfoils tend to generate less secondary loss than do front-loaded airfoils.

In addition, the amount of loading generated by an airfoil is of interest. Generally, the load value of an airfoil may be expressed as a non-dimensional loading parameter known as the Zweifel load coefficient as known to one of ordinary skill in the art. The Zweifel load coefficient is a ratio of the actual airfoil load to the ideal airfoil load.

The Zweifel load coefficient is calculated according to the following equation:

$$\text{Zweifel Load Coefficient} = 2\left(\frac{s}{B_x}\right)\cos^2\alpha_2\left(\tan\alpha_2 + \frac{C_{X1}}{C_{X2}}\tan\alpha_1\right)$$

where
s is the airfoil pitchwise spacing;
$B_X$ is the airfoil axial chord length;
$\alpha_1$ is the airfoil inlet flow angle relative to an axial plane;
$\alpha_2$ is the airfoil exit flow angle relative to an axial plane;
$C_{X1}$ is the airfoil inlet axial flow velocity; and
$C_{X2}$ is the airfoil exit axial flow velocity.

For a given loading per row of airfoils, the loading per airfoil can be controlled by adjusting either or both the airfoil count or the airfoil size. For example, a reduction in either of these two parameters can reduce both weight and cost of the airfoil while in turn increasing the airfoil loading. However, increased airfoil loading may push the airfoil into an unfavorable operational regime with respect to increased airfoil secondary flow losses. For example, high-lift airfoils generally possess a Zweifel load coefficient of greater than 1.2. However, the use of high-lift airfoils for turbomachinery applications is typically avoided due to certain performance obstacles. It has been observed that turbomachinery utilizing high-lift airfoils may exhibit airfoil flow separation or undesirable boundary layer thickening as well as greater secondary losses.

One conventional airfoil design of the prior art achieved a Zweifel load coefficient of up to 1.16 by employing an airfoil having a mixed-loading convention. However, in order to achieve a Zweifel load coefficient greater than 1.16, the size of each airfoil had to be adjusted and/or the number of airfoils had to be changed.

Consequently, there exists a need for a high-lift airfoil design that reduces the total pressure loss by improving both the characteristics of the airfoil and end wall boundary layers, and by minimizing the interaction between the two boundary layers as compared to past mixed-loading airfoils designs.

SUMMARY OF THE INVENTION

In accordance with the present invention, a blade broadly comprises a platform; a concave pressure side; a convex suction side; and an airfoil broadly comprising a root section comprising a first loading convention and an attachment engaged to the platform; a midspan section comprising a second loading convention; a tip section comprising a third loading convention, wherein a spanwise distribution of the first loading convention, the second loading convention and the third loading convention across a span of the airfoil comprises a mixed-loading convention and a Zweifel load coefficient equal to about or greater than about 1.2.

In accordance with the present invention, a vane, broadly comprises a platform; a concave pressure side; a convex suction side; and an airfoil broadly comprising a root section comprising a first loading convention, wherein the root section further comprises an attachment engaging the platform; a midspan section comprising a second loading convention; a tip section comprising a third loading convention; and wherein a spanwise distribution of the first loading convention, the second loading convention and the third loading convention across a span of said airfoil comprises a mixed-loading convention and a Zweifel load coefficient equal to about or greater than about 1.2.

In accordance with the present invention, a method of turning air in a turbomachinery application broadly comprises applying a working medium fluid comprising at least one direction and a velocity to a turbine of the turbomachinery application, wherein the at least one direction of the fluid is parallel to a centerline of the turbine and the turbine comprises a plurality of mixed-loading airfoils positioned to reduce pressure losses experienced by the turbine; and turning the fluid as the fluid passes through the plurality of mixed-loading airfoils of the turbine; wherein the airfoils comprise a root section comprising a first loading convention, a midspan section comprising a second loading convention, a tip section comprising a third loading convention, wherein a spanwise distribution of the first loading convention, the second loading convention and the third loading convention across a span of the airfoil comprises a mixed-loading convention and a Zweifel load coefficient equal to about or greater than about 1.2.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2c is a cross-section of the midspan section of the airfoil of FIG. 2a.

FIG. 2d is a cross-section of the root section of the airfoil of FIG. 2a;

Like reference numbers and designations in the various drawings indicate like elements.

DETAILED DESCRIPTION

An airfoil embodying a combination of loading conventions in a single high-lift design specifically to reduce and control the total pressure losses that occur in the working medium fluid passages between airfoils employed in turbomachinery applications is disclosed herein. As will be discussed in greater detail, a high-lift airfoil embodying mixed-loading conventions exhibits the most favorable total pressure loss characteristics possessed by both aft-loaded airfoil and front-loaded airfoil conventions. Moreover, such mixed-loading conventions are capable of more favorably influencing the development of an airfoil surface boundary layer in such applications, as well as the interaction of airfoil surface boundary layers with the endwall boundary layers.

The high-lift airfoil design(s) of the present invention overcome these performance obstacles using a mixed-loading convention described herein. The high-lift airfoil design(s) embodying a mixed-loading convention of the present invention will exhibit a Zweifel load coefficient equal to about or greater than about 1.2 yet will not in turn produce airfoil flow separation or increased secondary losses unlike prior art airfoil designs.

Generally, airfoil designs will always possess two distinct surfaces, that is, a pressure side and a suction side, which results in the turning of the working medium fluid during the airfoil's use. Alterations may be made to the airfoil's design in order to increase and/or decrease the turning of the working medium fluid pursuant to the desired application as is known to one of ordinary skill in the art.

A mixed-loading airfoil design described herein combines aft-loading conventions and front-loading conventions while also employing airfoil surfaces possessing different distributions of curvature along its span. As will be discussed further, the airfoil's ability to influence the behavior of the boundary layers forming along its surfaces, as well as influencing the interaction of airfoil surface boundary layers and endwall boundary layers, and possessing the benefits of both aft-loaded and front-loaded designs are a function of these curvature values. The thickness of the mixed-loaded airfoils may be varied accordingly for the intended applications as known to one of ordinary skill in the art; however, changes in airfoil thickness will result in changes to the curvature of the airfoil surface. Likewise, it is contemplated that the present mixed airfoil design may be utilized beyond the turbomachinery applications initially considered.

Figure 1:
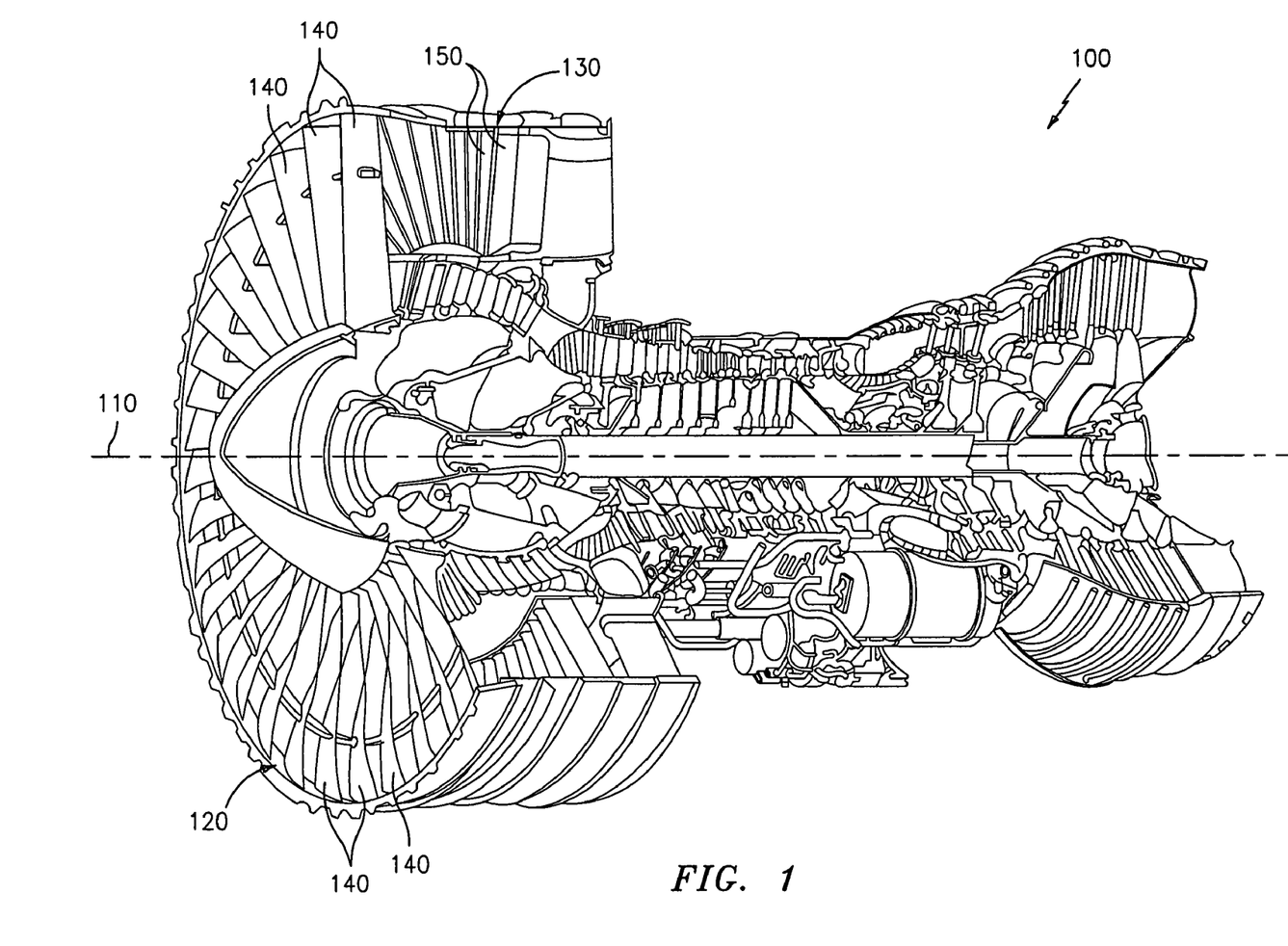
FIG. 1 depicts a representative gas turbine engine utilizing both rotating fan blades embodying the mixed loading convention of the present invention and both compressor airfoils and turbine airfoils embodying the mixed loading convention of the present invention.

Referring generally now to FIG. 1, a representative assembly of a gas turbine engine 100 is shown. The gas turbine engine 100 may comprise a rotating turbine blade assembly 120 comprising a plurality of blades 140 comprising mixed-loading airfoils and a stationary turbine vane assembly comprising a plurality of vanes 150 comprising mixed-loading airfoils. Each airfoil has a root section, a midspan section, and a tip section, and a leading edge located at or near the upstream end of the airfoil and a trailing edge located at or near the downstream end of the airfoil. For a stationary turbine engine assembly, the root section and/or tip section of each vane will be attached to both the inner- and outer-diameter endwalls. For a rotating turbine engine assembly, the root section and/or tip section of each blade will be attached to a platform and configured to fixedly engage the disk of the engine. The blade may be shrouded, meaning the blade tip section is attached to a portion of the outer endwall that is rotating at the same rate as the blade itself. The blade may also be unshrouded, meaning the blade tip section is not attached to the outer endwall. In this configuration, the outer endwall is not rotating, and a gap exists between the blade tip section and the endwall.

Figure 2A:
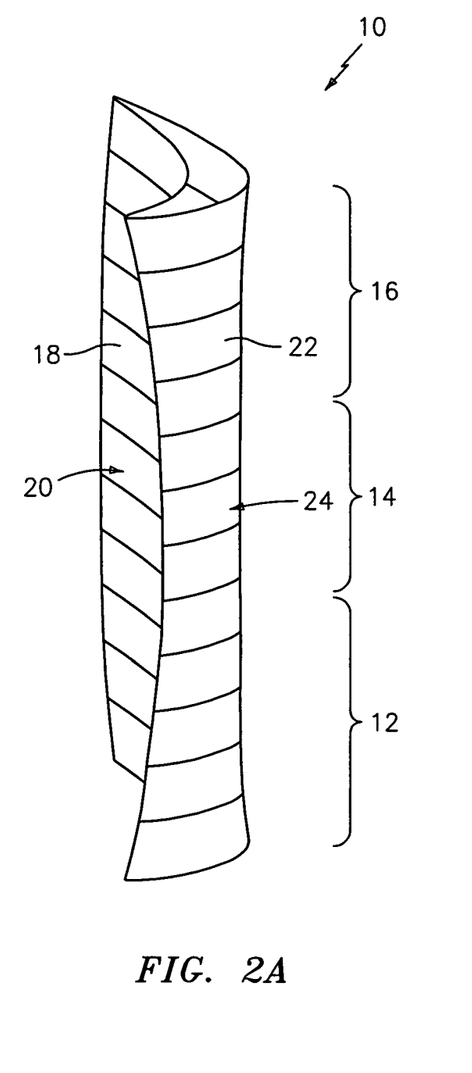
FIG. 2a is a three-dimensional side view of an exemplary embodiment of an airfoil of the present invention.
Figure 2B:
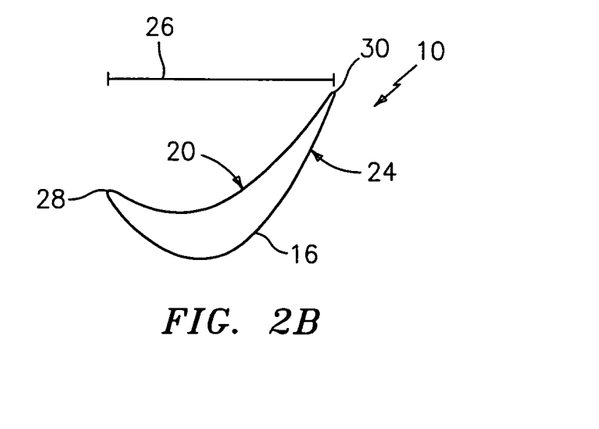
FIG. 2b is a cross-section of a tip section of the airfoil of FIG. 2.
Figure 2C:
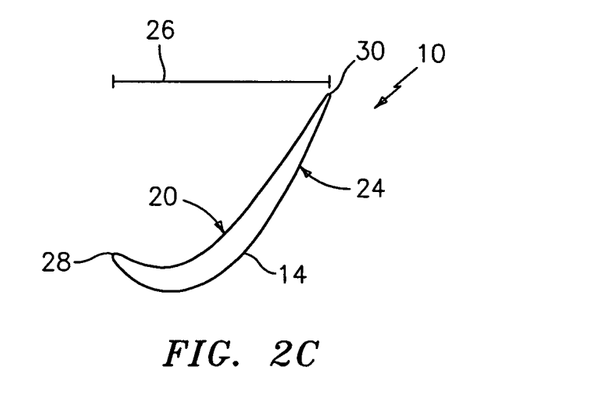
Figure 2D:
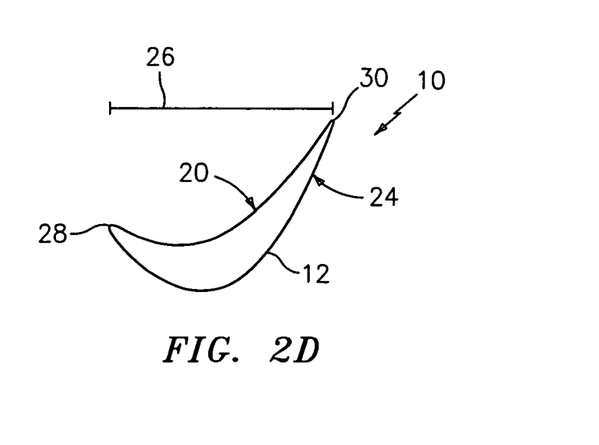

Referring now to FIGS. 2a-2d, a mixed-loading airfoil may comprise a root section 12, a midspan section 14, a tip section 16. A concave surface 18 along the span of the airfoil from root section 12 to tip 16 is referred to as a pressure side 20, while the convex surface 22 along the span of the airfoil from root section 12 to tip section 16 is referred to as a suction-side 24. Referring specifically now to mixed-loading airfoil 10, FIG. 2b illustrates a cross-sectional view of tip section 16 of airfoil 10, while FIG. 2c illustrates a cross-sectional view of midspan section 14 of airfoil 10, and, similarly, FIG. 2d illustrates a cross-sectional view of root section 12 of airfoil 10. An axial chord 26 is depicted in each of FIGS. 2b-2d. Axial chord is defined as the axial length of the projection of the airfoil onto a plane containing the engine axis. It should be noted that axial chord 26 is not required to maintain a constant length along the span of the airfoil, for the root section, midspan section, and tip section of airfoil 10.

Figure 3A:
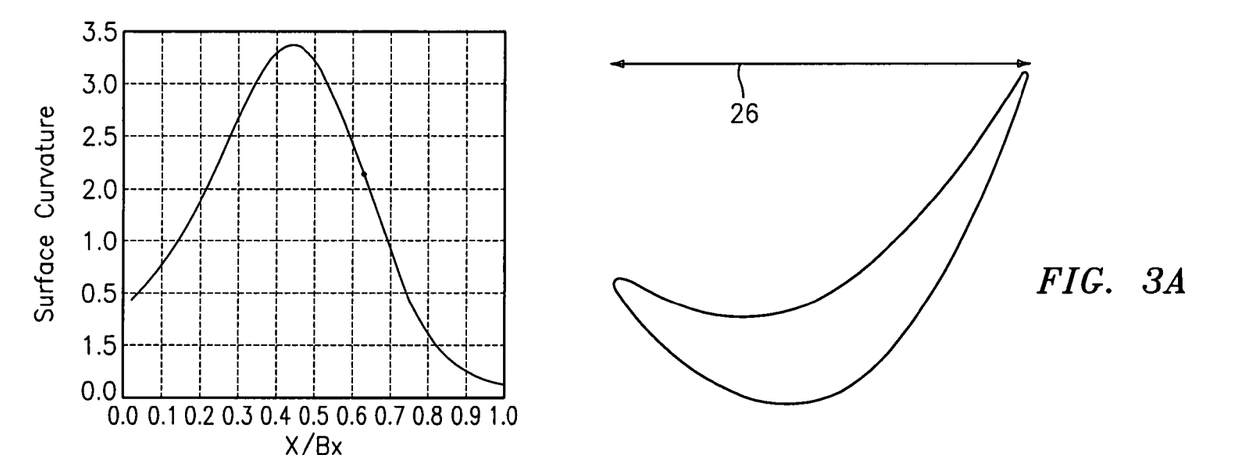
FIG. 3a is a suction-side curvature graph of a typical aft-loaded root section or tip section of an airfoil whose cross-sections are shown to the right.
Figure 3B:
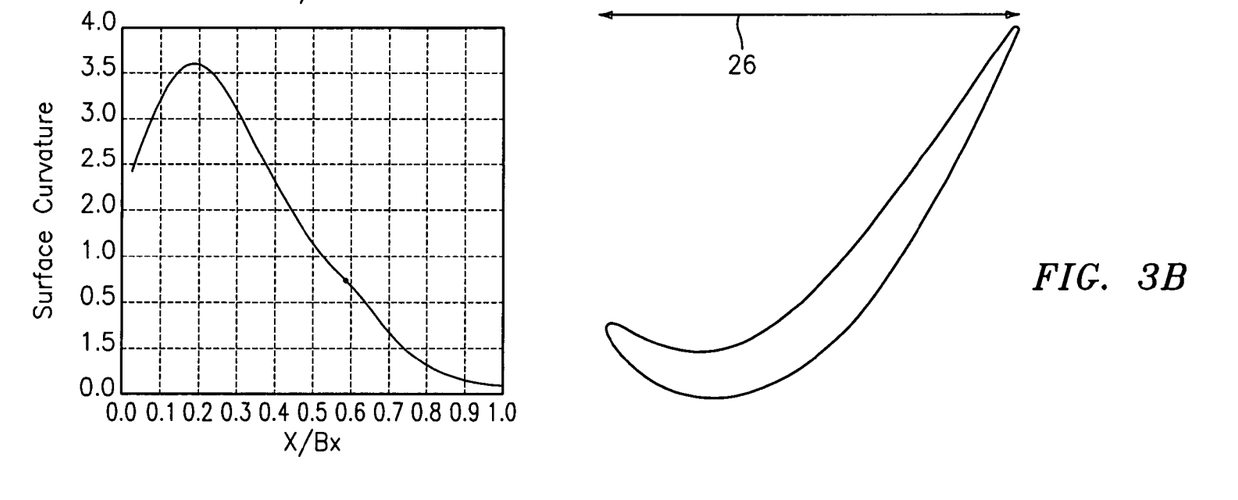
FIG. 3b is a suction-side curvature graph of a front-loaded midspan section of an airfoil whose cross-section is shown to the right.
Figure 4A:
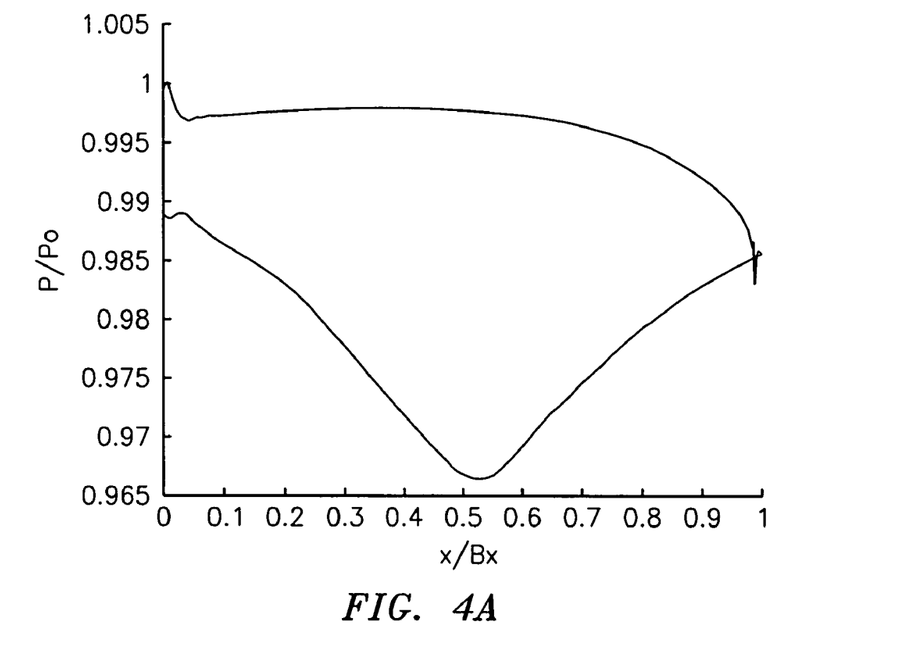
FIG. 4a is a graph of a representative pressure distribution for an aft-loaded airfoil.
Figure 4B:
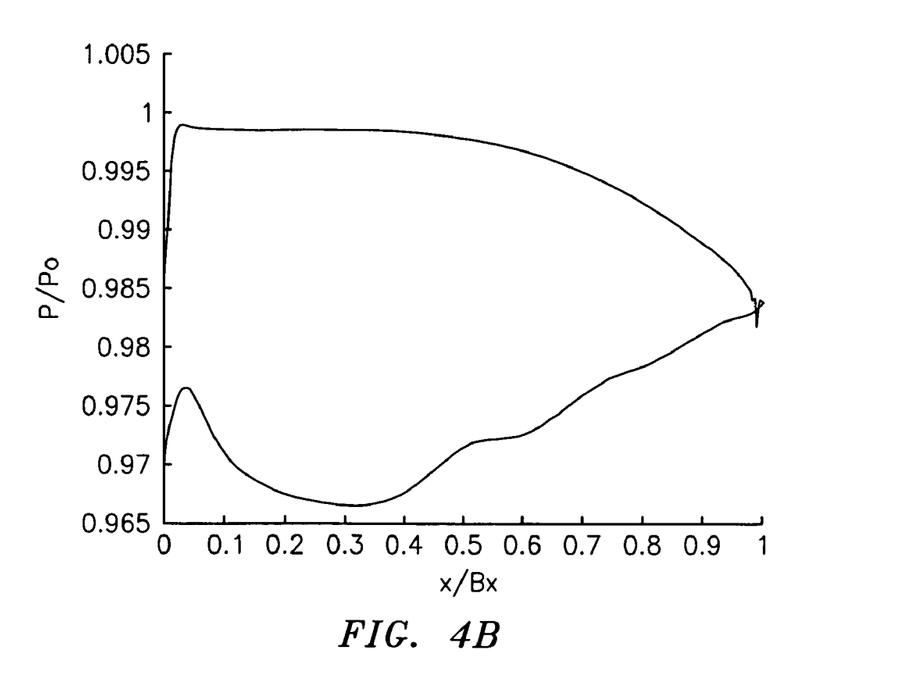
FIG. 4b is a graph of a representative pressure distribution for a front-loaded airfoil.

Referring collectively now to FIGS. 3a-4b, the various loading philosophies applied to the mixed loading airfoil design of the present invention will now be discussed in greater detail. FIGS. 3a and 4a depict a cross-section of a typical aft-loaded root section 12 or tip section 16 of airfoil 10 and an aft-loaded section's representative pressure distribution graph, respectively. FIGS. 3b and 4b depict a cross-section of front-loaded midspan section 14 of airfoil 10 and a front-loaded section's representative pressure distribution graph, respectively.

When comparing the aft-loaded root and tip cross-sections with the front-loaded midspan cross-sections shown in FIGS. 3a and 3b, one recognizes that the axial chord 26 of each section may or may not be equivalent. The suction-side curvature graphs shown in each figure represent the curvature values calculated using a derivative of the measurements taken at points along the surface of suction-side 24 of each section respectively as known to one of ordinary skill in the art. The airfoil section is oriented in an engine-installed frame of reference, with the X axis parallel to the centerline axis of the engine and the Y axis extending in the pitchwise, or rotational, axis of the engine. The positive direction of the X axis unit vector is from the front of the engine towards the back of the engine. The positive direction of the Y axis unit vector is from the airfoil pressure side to the airfoil suction side. The coordinate system of FIGS. 3a and 3b utilize the previously mentioned X and Y axes, with the X-axis origin being located at the airfoil leading edge point and the X and Y coordinates being normalized to the airfoil axial chord length. The airfoil suction-side and pressure-side Y coordinates can be defined as a function of the X coordinate, y=f(x), for locations just away from the leading and trailing edge point. The suction-side and pressure-side curvatures are calculated using the following equation $$\text{Curvature} = \frac{y''}{(1+(y')^2)^{\frac{3}{2}}}$$

where y' refers to the first derivative of an airfoil surface coordinate in the previously defined reference frame, y" refers to the second derivative of an airfoil surface coordinate in the previously defined reference frame. The suction-side curvature graph of aft-loaded root and tip sections 12, 16 of airfoil 10 indicates that the maximum curvature of suction-side 24 may occur near or approximate to a midpoint of axial chord 26. In contrast, the suction-side curvature graph of front-loaded midspan section 14 of airfoil 10 indicates the maximum curvature of suction-side 24 may occur near or approximate to a quarterpoint of axial chord 26. The location of the maximum curvature of the front-loaded midspan section will always be upstream of the locations for the maximum curvature for both the aft-loaded root and tip sections 12, 16.

Depending upon the intended application of the mixed-loading airfoil, the location of the maximum curvature may vary depending upon the velocity being applied to the blade or vane by the working medium fluid produced by the turbine engine. As is understood by one of ordinary skill in the art, velocity is generally expressed in non-dimensional terms as a "Mach number", calculated as the ratio of the speed of an object to the speed of sound in the surrounding medium. In the instant case, the object of relevance is the working medium fluid. A general operating velocity of a working medium fluid for turbomachinery applications may comprise a range of about Mach 0.1 to about Mach 2.0. A moderate Mach operating range may comprise about Mach 0.1 to about Mach 1.0, while a high Mach operating range may comprise about Mach 1.0 to about Mach 2.0. Historically, the operating range of the working medium fluid may vary from about Mach 0.5 to about Mach 1.5. However, irrespective of the Mach operating range, the bulk of the pressure loading for the front-loaded midspan section will still be located upstream with respect to the bulk of the pressure loading for both the aft-loaded root and tip sections.

The increase in the Mach number causes the working medium fluid to flow along the surface of the airfoil differently, thus affecting the airfoil surface boundary layer and potentially increasing the airfoil's profile loss. As mentioned earlier, repositioning airfoils relative to each other will not ultimately improve performance and reduce the airfoil's profile loss. The resulting design of the mixed-loading airfoil described herein becomes dependent upon the intended turbomachinery application's Mach number and may change from application to application. A blade or vane may be measured using one or more methods known to one of ordinary skill in the art to determine whether the airfoil of a blade or vane embodies a mixed-loading convention. It is contemplated that the mixed-loading airfoils described herein may be utilized in various turbomachinery applications and for applications outside turbomachinery where the velocity of the working medium fluid is less than about Mach 0.1 and greater than about Mach 2.0.

The different distributions of curvature between the aft-loaded root and tip sections 12, 16 of airfoil 10 and front-loaded midspan section 14 of airfoil 10 create different results when said sections are exposed to working medium fluid as demonstrated in the sample pressure distribution graphs of FIGS. 4a and 4b. It should be noted that the sample pressure distribution graphs shown in FIGS. 4a and 4b represent pressure distribution across aft-loaded airfoils and front-loaded airfoils alone. However, the sample pressure distribution graphs of FIGS. 4a and 4b may be read and interpreted in light of a spanwise total pressure loss distribution plot shown in FIG. 5. One skilled in the art will recognize and appreciate immediately the pronounced benefits and advantages in mixed loading airfoil 10 over the aft-loading convention and front-loading convention taken alone, respectively.

Referring specifically now to FIG. 4a, the sample pressure distribution graph charts the normalized static pressure $[P/P_O]$ versus the normalized axial chord $[X/B_x]$ for a conventional aft-loaded airfoil design. The upper line on each graph shows the normalized pressure of a working medium fluid flowing over the pressure side, or a higher-pressure surface, of an aft-loaded airfoil design while the lower line on each graph shows the normalized pressure of a working medium fluid flowing along the suction-side, or a lower pressure surface, of the aft-loaded airfoil design. A negative slope value represents the acceleration of the working medium fluid across the surface of the aft-loaded airfoil while a positive slope indicates deceleration of the working medium fluid along the surface of the aft-loaded airfoil. The value of the slope of the pressure distribution is indicative of the strength of the fluid acceleration or fluid deceleration.

The sample pressure distribution graph of FIG. 4a indicates that as the working medium fluid flows along the suction-side of the aft-loaded airfoil, the fluid initially accelerates within a converging flow channel until reaching an approximate mid-chord region corresponding to the flow passage throat location. As the fluid passes this location, the flow channel widens and the fluid begins to decelerate as it approaches the airfoil trailing edge. The fluid deceleration will cause the airfoil surface boundary layer to thicken rather quickly within this region of strong adverse pressure gradient, which will contribute to the airfoil's profile loss. In contrast to how the working medium fluid flows along the suction-side surface, the fluid flowing along the pressure side surface of the aft-loaded airfoil gradually accelerates within the constricting flow channel.

Referring now to FIG. 4b, as the working medium fluid flows along the pressure side of a conventional front-loaded airfoil, the airflow gradually accelerates from the leading edge to the trailing edge. In contrast, as the fluid flows from the leading edge to the trailing edge along the suction-side of the front-loaded airfoil, the fluid velocity initially increases very quickly around the leading edge and then decelerates until approximately 0.05 along the normalized axial chord scale $[x/B_x]$ of FIG. 4b. At that point, the fluid velocity accelerates to approximately 0.30 normalized axial location and then gradually decelerates until reaching a value of approximately 0.98 along the normalized static pressure scale $[P/P_0]$ of FIG. 4b. As mentioned earlier, the deceleration of the fluid causes a total pressure loss to occur due to a thickening of the airfoil boundary layer within the unfavorable pressure gradient, though the strength of the deceleration is less than that of the aft-loaded design.

Figure 5:
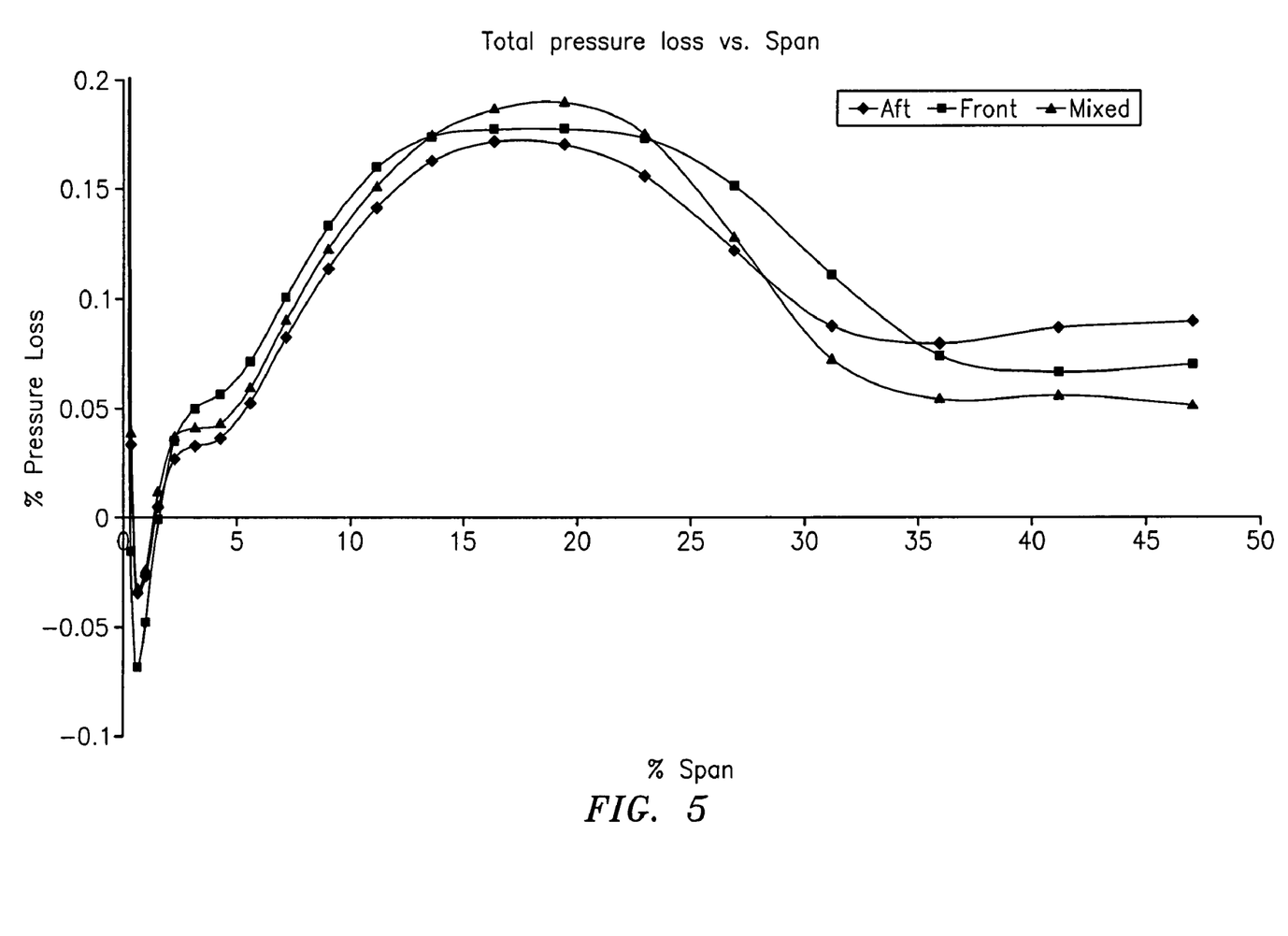
FIG. 5 is a plot of a spanwise distribution of a total pressure loss for an aft-loaded airfoil design of the prior art, a front loaded airfoil design of the prior art, and a mixed-loaded airfoil of the present invention.

Referring now to FIG. 5, the spanwise distribution of total pressure loss for an aft-loaded airfoil of the prior art, a front-loaded airfoil of the prior art, and an embodiment of the mixed-loaded airfoil described herein are shown over half the span of the airfoil. When the aft-loaded airfoil and front-loaded airfoil are compared against each other, it is evident that the front-loaded design has lower profile losses in the midspan region than the aft-loaded airfoil. Likewise, the aft-loaded airfoil has lower secondary losses than the front-loaded design close to the endwalls. The mixed-loading airfoil described herein combines the positive characteristics of both the aft-loaded and front-loaded airfoil spanwise total pressure loss distributions as illustrated in FIG. 5. The mixed-loading airfoil possesses an airfoil profile loss lower than that of the aft-loaded airfoil and similar to that of the front-loaded airfoil. In addition, the mixed-loading airfoil possesses secondary losses lower than those of the front-loaded airfoil and similar to that of the aft-loaded airfoil. The mixed-loaded design combines into one design the best profile and secondary loss features of both the front- and aft-loaded airfoil geometries.

Referring again to FIG. 1, the mixed-loading airfoil designs described herein may be utilized in blades and/or vanes to reduce pressure losses experienced by, for example, gas turbine engines incorporating both rotating and stationary turbomachinery components.

For example, a gas turbine engine 100 may comprise a rotating turbine blade assembly 120 comprising a plurality of blades 140 embodying the mixed-loading airfoil design and positioned to reduce pressure losses experienced by the turbine engine. A working medium fluid having a direction and a velocity flows parallel to a centerline 110 through gas turbine engine 100. As the airfoils interact with the passing working medium fluid, the mixed-loading airfoil design minimizes the development and interaction of boundary layers forming along the airfoil and endwall surfaces.

In another example, a gas turbine engine 100 may comprise a stationary turbine vane assembly 130 comprising a plurality of vanes 150 embodying the mixed-loading airfoil design and positioned to reduce pressure losses experienced by the turbine engine. A working medium fluid having a direction and a velocity flows parallel to centerline 110 through the gas turbine engine 100. As the vane airfoils turn the fluid, the mixed airfoil design minimizes the development and interaction of boundary layers forming along the airfoil and endwall surfaces.

It is to be understood that the invention is not limited to the illustrations described and shown herein, which are deemed to be merely illustrative of the best modes of carrying out the invention, and which are susceptible to modification of form, size, arrangement of parts, and details of operation. The invention rather is intended to encompass all such modifications which are within its spirit and scope as defined by the claims.

What is claimed is:

1. A blade, comprising:
   a platform;
   a concave pressure side;
   a convex suction side; and
   an airfoil comprising:
   a root section comprising a first loading convention and an attachment engaged to said platform;
   a midspan section comprising a second loading convention;
   a tip section comprising a third loading convention, wherein a spanwise distribution of said first loading convention, said second loading convention and said third loading convention across a span of said airfoil comprises a mixed-loading convention and a Zweifel load coefficient equal to about or greater than about 1.2.

2. The blade of claim 1, wherein said span comprises a plurality of distributions of curvature and extends from said root section to said tip section.

3. The blade of claim 2, wherein said root, midspan and tip sections each comprise a plurality of curvature values at a plurality of locations on an axial chord of said airfoil.

4. The blade of claim 3, wherein each of said sections comprises a maximum curvature value within said plurality of said curvature values.

5. The blade of claim 4, wherein said maximum curvature value of said root section is located on said axial chord at a position greater than said maximum curvature value of said midspan section.

6. The blade of claim 4, wherein said maximum curvature value of said tip section is located on said axial chord at a position greater than said maximum curvature value of said midspan section.

7. The blade of claim 1, wherein said root section disposed contiguous to said midspan section possesses a spanwise distribution of total pressure loss for a mixed-loading convention as illustrated in FIG. 5.

8. The blade of claim 1, wherein said first loading convention and said third loading convention are aft-loaded.

9. The blade of claim 1, wherein said second loading convention is front-loaded.

10. The blade of claim 1, wherein said tip section is not attached to an outer endwall of an engine shroud.

11. A vane, comprising:
   a platform;
   a concave pressure side;
   a convex suction side; and
   an airfoil comprising:
     a root section comprising a first loading convention, wherein said root section further comprises an attachment engaging said platform;
     a midspan section comprising a second loading convention;
     a tip section comprising a third loading convention; and
     wherein a spanwise distribution of said first loading convention, said second loading convention and said third loading convention across a span of said airfoil comprises a mixed-loading convention and a Zweifel load coefficient equal to about or greater than about 1.2.

12. The vane of claim 11, wherein said span comprises a plurality of distributions of curvature and extends from said root section to said tip section.

13. The vane of claim 12, wherein said root, midspan and tip sections each comprise a plurality of curvature values at a plurality of locations on an axial chord of said airfoil.

14. The vane of claim 13, wherein each of said sections comprises a maximum of curvature value within said plurality of said curvature values.

15. The vane of claim 14, wherein said maximum curvature value of said root section is located on said axial chord at a position greater than said maximum curvature value of said midspan section.

16. The vane of claim 14, wherein said maximum curvature value of said tip section is located on said axial chord at a position greater than said maximum curvature value of said midspan section.

17. The vane of claim 11, wherein said root section disposed contiguous to said midspan section possesses a spanwise distribution of total pressure loss for a mixed-loading convention as illustrated in FIG. 5.

18. The vane of claim 11, wherein said first loading convention and said third loading convention are aft-loaded.

19. The vane of claim 11, wherein said second loading convention is front-loaded.

20. The vane of claim 11, wherein said tip section is attached to an outer endwall of an engine shroud.

21. A method of turning air in a turbomachinery application, comprising:
   providing a turbine having a plurality of mixed load airfoils wherein each said airfoil comprises a root section comprising a first loading convention, a midspan section comprising a second loading convention, a tip section comprising a third loading convention, and a spanwise distribution of said first loading convention, said second loading convention and said third loading convention across a span of said airfoil comprises a mixed-loading convention and a Zweifel load coefficient equal to about or greater than about 1.2;
   applying a working medium fluid having at least one direction and a velocity to said turbine, wherein said at least one direction of said fluid is parallel to a centerline of said turbine and said plurality of mixed load airfoils are positioned to reduce pressure losses experienced by said turbine; and
   turning said fluid as said fluid passes through said plurality of mixed-loading airfoils of said turbine.

22. The method of claim 21, wherein said airfoil is an integral part of a vane.

23. The method of claim 21, wherein turning said fluid comprises:
   passing said fluid against said mixed-loading airfoils of a plurality of vanes; and
   turning of said fluid by said mixed-loading airfoils.

24. The method of claim 23, wherein said velocity comprises a range of about Mach 0.1 to about Mach 2.0.

25. The method of claim 21, wherein said airfoil is an integral part of a blade.

26. The method of claim 21, wherein turning said fluid comprises:
   passing said fluid against said mixed-loading airfoils of a plurality of blades;
   rotating said plurality of blades by said velocity of said fluid; and
   turning said fluid by said mixed-loading airfoils.

27. The method of claim 26, wherein said velocity comprises a range of about Mach 0.1 to about Mach 2.0.

* * * * *